US012725604B2

(12) United States Patent
Nir et al.

(10) Patent No.: US 12,725,604 B2
(45) Date of Patent: Sep. 1, 2026

(54) VIDEO SCENE DESCRIBER

(71) Applicant: Microsoft Technology Licensing, LLC, Redmond, WA (US)

(72) Inventors: Oron Nir, Herzliya (IL); Shemer Shmuel Steinlauf, Tel-Aviv (IL); Eliyahu Strugo, Tel Aviv (IL)

(73) Assignee: Microsoft Technology Licensing, LLC, Redmond, WA (US)

( * ) Notice: Subject to any disclaimer, the term of this patent is extended or adjusted under 35 U.S.C. 154(b) by 204 days.

(21) Appl. No.: 18/429,124

(22) Filed: Jan. 31, 2024

(65) Prior Publication Data

US 2025/0246176 A1 Jul. 31, 2025

(51) Int. Cl.
*G10L 13/02* (2013.01)
*G06V 20/40* (2022.01)

(52) U.S. Cl.
CPC .............. *G10L 13/02* (2013.01); *G06V 20/40* (2022.01)

(58) Field of Classification Search
CPC ........ G06V 10/82; G06V 20/46; G06V 20/40; G06V 30/10; G06V 20/49; G06F 16/45; G10L 13/02; G10L 15/26; G06N 20/00; G06N 3/045
See application file for complete search history.

(56) References Cited

U.S. PATENT DOCUMENTS 6,877,134 B1 * 4/2005 Fuller .................... G06F 16/58 715/255
10,560,734 B2 2/2020 Jassin et al.
10,762,375 B2 9/2020 Ronen et al.
10,936,630 B2 3/2021 Ronen et al.
11,363,084 B1 * 6/2022 Mishra .................... H04L 65/40
12,518,740 B1 * 1/2026 Carre ...................... G10L 15/01
2013/0067333 A1 * 3/2013 Brenneman ............. G06F 21/10 715/721
2018/0132011 A1 * 5/2018 Shichman ............ H04N 21/233
2018/0356893 A1 * 12/2018 Soni ........................ G06F 3/014
2021/0174146 A1 6/2021 Nir et al.
(Continued)

OTHER PUBLICATIONS

Extended European Search Report Received in European Patent Application No. 25150369.4, mailed on May 27, 2025, 10 pages.
(Continued)

*Primary Examiner* — Jakieda R Jackson

(57) ABSTRACT

Examples of the present disclosure describe a video scene describer. The video scene describer receives video content data as input and provides audio description (AD) data as output. The video scene describer utilizes one or more components using artificial intelligence (AI) and/or algorithms to analyze and describe the video content data. For example, the video scene describer may include a video indexer component to identify and describe particular aspects of the video content data and generates video insights data based on the analysis. The video indexer provides video insights data to a large language model (LLM) component. The video scene describer may additionally include a visual-language model system, which includes a visual encoder, a relation aggregator, a transformer encoder, and/or transformer. The LLM component synthesizes the video insights data and video embedding data, along with any prompt (e.g., a request or question) or dialogue context, to provide the AD data.

20 Claims, 5 Drawing Sheets

300

(56) References Cited

U.S. PATENT DOCUMENTS

| | | | | |
|---|---|---|---|---|
| 2021/0303924 | A1* | 9/2021 | Sakthivel | G06F 16/7844 |
| 2021/0383171 | A1* | 12/2021 | Lee | G06F 18/217 |
| 2022/0366131 | A1* | 11/2022 | Ekron | G06F 9/453 |
| 2023/0306056 | A1* | 9/2023 | Lee | G06V 20/49 |
| 2024/0045902 | A1* | 2/2024 | Park | G06V 20/41 |
| 2024/0127804 | A1* | 4/2024 | Shirodkar | G10L 15/1807 |
| 2024/0212249 | A1* | 6/2024 | Ume | G10L 21/10 |
| 2025/0119625 | A1* | 4/2025 | Bhattacharyya | G06F 40/30 |
| 2025/0156567 | A1* | 5/2025 | Belgi | G06F 16/784 |

OTHER PUBLICATIONS

Han, et al., "AutoAD II: The Sequel—Who, When, and What in Movie Audio Description", Proceedings of the IEEE/CVF International Conference on Computer Vision, Oct. 1, 2023, pp. 13599-13609.

Zhang, et al., "MM-Narrator: Narrating Long-form Videos with Multimodal In-Context Learning", In Repository of arXiv:2311.17435v1, Nov. 29, 2023, 17 Pages.

Li, et al., "Blip-2: Bootstrapping Language-image Pre-training with Frozen Image Encoders and Large Language Models", Iin Repository of arXiv:2301.12597v3, Jun. 15, 2023, 13 Pages.

Li, et al., "Uniformerv2: Spatiotemporal Learning by Arming Image Vits with Video Uniformer", In Repository of arXiv:2211.09552v1, Nov. 17, 2023, pp. 1-24.

Li, et al., "Videochat: Chat-Centric Video Understanding", In Repository of arXiv:2305.06355v1, May 10, 2023, pp. 1-17.

Nir, et al., "CAST: Character labeling in Animation using Self-supervision by Tracking", In Proceedings of Computer Graphics Forum, vol. 41, Issue 2, May 2022, pp. 135-145.

Touvron, et al., "Llama 2: Open Foundation and Fine-Tuned Chat Models", In Repository of arXiv:2307.09288v2, Jul. 19, 2023, pp. 1-77.

Wang, et al., "InternVideo: General Video Foundation Models via Generative and Discriminative Learning", In Repository of arXiv:2212.03191v2, Dec. 7, 2022, pp. 1-18.

* cited by examiner

300

400

VIDEO SCENE DESCRIBER

BACKGROUND

Video content is often not provided in a manner that is accessible to all people. For example, people having physical impairments, such as visual impairments, are often unable to consume aspects of the video content (e.g., on-screen text and unvoiced events). This inaccessibility of the video content can significantly diminish the video content consumption experience.

It is with respect to these and other general considerations that the aspects disclosed herein have been made. Also, although relatively specific problems may be discussed, it should be understood that the examples should not be limited to solving the specific problems identified in the background or elsewhere in this disclosure.

SUMMARY

Examples of the present disclosure describe a video scene describer. The video scene describer receives video content data as input and provides audio description (AD) data as output. The video scene describer utilizes artificial intelligence (AI) and/or algorithms to analyze and describe the video content data. For example, the video scene describer may include a video indexer component that identifies and describes particular aspects of the video content data and generates video insights data based on the analysis. The video scene describer may additionally include a visual-language model system that generates video embedding data for the video content data. The video insights data and the video embedding data are provided as input to a large language model (LLM) component, which uses the input to generate the AD data. The video indexer provides video insights data to a large language model (LLM) component.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Additional aspects, features, and/or advantages of examples will be set forth in part in the description which follows and, in part, will be apparent from the description, or may be learned by practice of the disclosure.

BRIEF DESCRIPTION OF THE DRAWINGS

Examples are described with reference to the following figures.

DETAILED DESCRIPTION

Video content is often not provided in a manner that is accessible to people having physical impairments, such as visual impairments. For example, some visual aspects of video content (e.g., on-screen text and unvoiced events) may not be detectable or fully appreciated by people having visual impairments. The inability to detect or fully appreciated such visual aspects can significantly diminish the experience of consuming (e.g., viewing or otherwise interacting with) the video content.

Examples of the present disclosure provide a solution to the video content inaccessibility challenges described above. Examples described herein provide for a video scene describer. The video scene describer receives video content data as input and provides audio description (AD) data as output. In some examples, video content data refers to audiovisual content, visual content, or substantially any media that can be viewed, with or without audio, on a display medium (e.g., a screen or surface). In some examples, AD data is an textual- or audio-based description of audio elements, visual elements, explicit elements, and/or implicit elements of the video content data. The video scene describer utilizes one or more components that implement artificial intelligence (AI) and/or algorithms to analyze and describe the video content data. For example, the video scene describer may include a video indexer component that identifies and perform particular functions on the video content data (e.g., optical character recognition (OCR), speech to text (STT), facial recognition) and generates video insights data based on the analysis. The video scene describer may additionally include a visual-language model system that generates video embedding data for the video content data by encoding the video content data, identifying pairwise or global relations between the visual features of the video content data, and/or combining the visual features with audio features of the video content data. The video insights data and the video embedding data are provided as input to a large language model (LLM) component, which uses the input to generate the AD data. The AD data includes an immersive textual or audio description of the visual or audiovisual aspects of the video content data, which enables people having physical impairments to fully appreciate the video content data.

Figure 1:
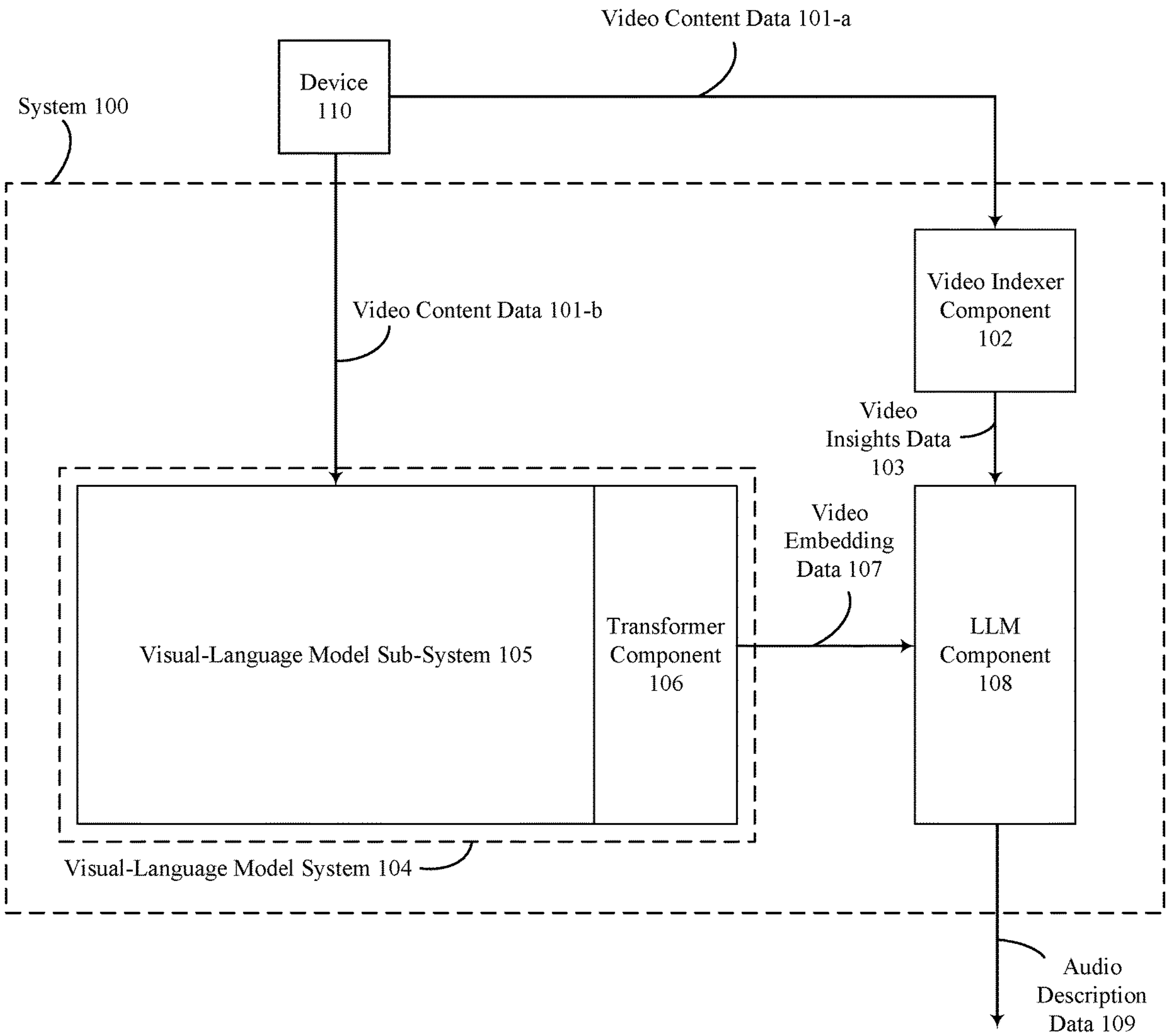
FIG. 1 illustrates an example system diagram that implements a video scene describer in accordance with examples described herein.

FIG. 1 illustrates a system 100 that implements a video scene describer. System 100, as presented, includes a combination of interdependent components that interact to form an integrated whole. Components of system 100 include hardware components or software components (e.g., application programming interfaces (APIs), modules, runtime libraries) implemented on and/or executed by hardware components of system 100. For example, system 100 uses one or more processors (e.g., central processing units (CPUs), graphical processing units (GPUs), or tensor processing units (TPUs) to execute instructions and perform software tasks. In some examples, system 100 represents a device such as a computer (e.g., a personal computer ("PC"), a laptop, or a server device), a mobile device (e.g., smartphone or a tablet), or any other type of electronic processing device. In other examples, system 100 represents a system comprising multiple devices. For example, at least a portion of system 100 is implemented by a cloud computing environment comprising a distributed collection of servers hosting software and infrastructure that is accessed over a network (e.g., the Internet).

System 100 includes video content data 101-*a* and video content data 101-*b* (collectively "video content data 101"), video indexer component 102, video insights data 103, visual-language model system 104, visual-language model sub-system 105, transformer component 106, video embedding data 107, LLM component 108, and Audio Description (AD) data 109. Although FIG. 1 depicts device 110 as being separate from system 100, in some examples, system 100 may be implemented within device 110 or device 110 may be implemented within system 100. Accordingly, the scale and structure of devices and environments discussed herein may vary and may include additional or fewer components than those described in FIG. 1 and subsequent figures. As one example, one or more of the model components (e.g., visual-language model system 104 or LLM component 108) or subcomponents thereof may be implemented locally to or remotely from system 100. For instance, one or more of the model components may be implemented in computing environments that are separate from a computing environment of system 100 (e.g., implemented in edge networks, fog networks, or service provider networks). In such instances, the model components may be accessible by system 100 and/or device 100 via APIs or other communication methods.

Video content data 101 represent visual data or audiovisual data. Examples of video content data 101 include movies, videos, GIFs, images, and/or other forms of digital media that can be presented, with or without sound, on a display medium. Video content data 101 may be presented via a television, the Internet, a live broadcast, a file, or the like. Examples formats of video content data 101 include MP4, MOV, AVI, WMV, FLV, F4V, MKV, WebM, AVCHD, GIF, JPG, PNG, TIFF, PSD, PDF, and RAW. In some examples, video content data 101 comprises one or more frames and one or more shots. A frame is a single still image that, when played in sequence with the other frames of video content data 101, creates motion on a display medium (e.g., screen). A shot is a series of frames that runs for an uninterrupted period of time. In some examples, a shot additionally includes associated audio or textual information corresponding to the series of frames in video content data 101.

Video content data 101 is provided by device 110. For example, device 110 provides video content data 101 to system 100 (e.g., via a user interface (UI) or API). Visual-language model sub-system 105 may receive video content data 101 (e.g., video content data 101-*b*) contemporaneously with or at a different time from video indexer component 102 receiving video content data 101 (e.g., video content data 101-*a*). In some examples, video indexer component 102 and visual-language model system 104 each receive the complete set of audiovisual data provided by device 110. The complete set of audiovisual data may refer to an entire file or stream of data representing video content data 101. Alternatively, video indexer component 102 and/or visual-language model system 104 may receive only a portion (e.g., the same portion or different portions) of the complete set of audiovisual data provided by device 110. In some examples, video content data 101 is processed using one or more intermediate components (not illustrated) prior to being provided to video indexer component 102 and visual-language model system 104. For example, a video preprocessing service may be used to format or modify attributes of video content data 101, such as the aspect ratio, color settings, or pixel density.

Video indexer component 102 receives video content data 101 (e.g., video content data 101-*a*), and video indexer component 102 includes one or more tools used to generate video insights data 103 based on video content data 101. For example, video indexer component 102 may include an OCR tool, a face recognition tool, a speech-to-text (STT) tool, an audio effects detection tool, a text-based emotion detection tool, a keyword extraction tool, a label identification tool, a named entity tool, an object tracking tool, and/or a topics inference tool, among other tools. In such examples, each of these tools may represent an individual model (e.g., a machine learning (ML) model). For instance, the face recognition tool may be embodied as an object detection model, the STT tool may be embodied as an Automatic Speech Recognition (ASR) model, and so on. Alternatively, the functionality of two or more tools may be included within a single model or distributed among multiple models.

The OCR tool extracts and/or recognizes text from video content data 101, such as text that might appear on signs, papers, or clothing in the video content data 101. The face recognition tool identifies faces of people, animals, robots, or the like in video content data 101, and may provide information about the faces. For example, the OCR tool may be capable of identifying that particular pixels comprise a "face", identifying particular characteristics of a "face" (e.g., emotion, age, gender, species), matching a previously identified face with a currently identified face to determine that the currently identified face is the same face or a different face as the previously identified face (e.g., matching identified features of the currently identified face and the previously identified face), or a combination of these. The speech transcription tool converts spoken words in video content data 101 into written text, and may provide punctuation, capitalization, and/or formatting for the written text. The audio effects detection tool detects and/or classifies various sounds (e.g., non-speech sounds) in the audio data, such as applause, laughter, music, silence, etc. The text-based and/or image-based emotion detection tool analyzes the sentiment of the text associated with video content data 101 (e.g., text in a transcript, captions, or subtitles), and assign a sentiment score (e.g., a label or score indicating a positive, negative, or neutral sentiment of the text) to the associated text. The keywords extraction tool identifies relevant words or phrases in video content data 101. In examples, relevance is determined based on the frequency or uniqueness of words or phrases, and/or based on whether the words or phrases in video content data 101 match a predefined list of words or phrases. The label identification tool recognizes and labels objects (e.g., people, faces, animals, vehicles), scenes (e.g., locations and landmarks), and activities (e.g., sports, events, object actions) in video content data 101. The named entity tool extracts the names of people, places, organizations, brands, and other entities mentioned in video content data 101. In some examples, the named entity tool may be implemented as part of the keywords extraction tool or the keywords extraction tool may be implemented as part of the named entity tool. The object tracking tool tracks detected objects across one or more shots of video content data 101. For example, an automobile detected across multiple (consecutive or non-consecutive) shots may be tracked to determine a motion path for the automobile across the multiple shots or to determine a predicted future location of the automobile in future shots. The topics inference tool infers the main topics or themes of video content data 101, such as politics, education, entertainment, etc.

In some examples, the outputs of one or more of the tools of video indexer component 102 includes textual information (e.g., a string of alphabetic and/or numeric characters). Video indexer component 102 may include a text encoder configured to convert the textual information from the tools into a number or feature vector ("vector") representation. Some examples of text encodings used by the text encoder include ASCII, UTF-8, and Base64. Video indexer component 102 provides the textual information and/or the text encoded information to LLM component 108 as video insights data 103. Video indexer component 102 and/or one or more of its tools may be operated in a cloud computing environment, in a provider network, locally at a customer device, or in any other configuration.

Video insights data 103 refer to facts or information of relevance in video content data 101. Examples of video insights data 103 include transcripts, OCR elements (e.g., text that might appear on signs, papers, or clothing), objects, topics, keywords, object information (e.g., age, gender, emotion, landmarks), non-speech audio sounds (e.g., applause, laughter, music, silence), text sentiment scores and/or classification, relevant words or phrases, labels (e.g., objects, scenes, an activities labels), named entities (e.g., names of people, places, organizations, brands), object detection information (e.g., detected objects and predicted object locations), topic inferences (e.g., inferred topics or themes), speech attributes of audio data (e.g., language, accent, tone, speed, genre, style, mood), visual attributes of visual data (e.g., theme, color, brightness, contrast, saturation, location, date, time, weather, camera angle, movement, zoom, focus, facial expressions, gestures, posture, eye contact), and other scene-related information (e.g., background attributes, foreground attributes, transitions, logos, trademarks, symbols, icons).

Visual-language model system 104 is an architecture that includes one or more components and/or sub-systems that integrate video and language models. In examples, visual-language model system 104 implements or is built using AI models, such as Bootstrapping Language-Image Pre-training (BLIP)-2 and/or Stable Vicuna. BLIP-2 is a scalable multimodal pre-training method that enables LLMs to understand images while keeping one or more of their parameters frozen. Stable Vicuna is a large language model that is fine-tuned using instruction fine-tuning and reinforcement learning from human feedback. Visual-language model system 104 includes visual-language model sub-system 105 and transformer component 106. In some examples, visual-language model system 104 further includes one or more components of an AI model designed to handle video-based dialogue.

Visual-language model sub-system 105 includes (or includes the functionality of) a visual encoder, a relation aggregator, and/or a transformer encoder. The visual encoder transforms video content data 101 into a suitable (e.g., an expected or compatible) representation for further processing by visual-language model sub-system 105. For example, the visual encoder receives video content data 101 as input and extracts visual features from video content data 101. Visual features are numerical values that represent the appearance, shape, color, texture, and/or motion of the objects and scenes in video content data 101. The visual features are extracted using a pretrained model that is included within or otherwise accessible to system 100. The pretrained model may be a neural network or another type of machine learning (ML) implementation that has been previously trained on a large dataset of videos or images. For example, a Vision Transformer (ViT)-G model is a pretrained model that uses self-attention mechanisms to encode visual information into a sequence of vectors.

The visual encoder applies a temporal modeling module and/or a relation aggregator to capture temporal relations among frames of video content data 101. Temporal relations are the patterns or dependencies that exist between different moments in time, such as causality, continuity, or similarity. A temporal modeling module is a component that analyzes the changes or dynamics of the visual features over time and can be based on convolutional neural networks (CNNs), recurrent neural networks (RNNs), or attention-based neural networks. A relation aggregator is a component that summarizes pairwise or global relations between the visual features of different frames, and can be based on pooling, attention, or graph neural networks. For example, a Global Multi-Head Relation Aggregator (GMHRA) is a relation aggregator that uses multiple attention heads to compute different aspects of the relations, and then concatenates the aspects into a single vector. The relation aggregator captures long-range dependencies and temporal dynamics of video content data 101, and enhances the video representation, such as those performed by transformer encoder or LLM component 108. The visual encoder outputs a sequence of video tokens that represent video content data 101. Video tokens include units of information that encode the visual features and temporal relations of video content data 101. The visual encoder provides the sequence of video tokens to the transformer encoder. Another example of a temporal modeling module is a Temporal Feature Aggregation (TFA) module, which performs adaptive weighting of the visual features of different frames based on their quality and relevance. A TFA module can use a self-attention mechanism to assign importance scores to each frame, and then aggregate the features using a weighted average or a max-pooling operation. A TFA module can capture the salient and informative frames of video content data 101, and filter out the redundant or noisy frames. An example of a relation aggregator that can work with a TFA module is a Multi-Conv Attention (MCA) module, which fuses the visual and textual features of video content data 101 using multiple convolutional layers and attention mechanisms. An MCA module can exploit the inter-modal correlations and complementarities between the visual and textual modalities, and map them to a common feature space. The MCA module can enhance the multimodal representation of video content data 101, and improve the performance of downstream tasks, such as video captioning or video question answering.

In examples, visual encoders use any of several different algorithms for visual encoding. For instance, in one example, a visual encoder uses two parallel pathways to capture both slow and fast motion in video content data 101. The slow pathway operates at a low frame rate and focuses on the semantic information, while the fast pathway operates at a high frame rate and focuses on the motion information. The two pathways are fused by lateral connections that enable cross-pathway communication. This means that the features extracted by the slow and fast pathways are combined at multiple layers of the network, allowing the model to learn a unified representation of both semantic and motion information. The lateral connections also help to balance the learning dynamics of the two pathways, which may have different convergence rates due to their different frame rates. The visual encoder uses three dimensional (3D) CNNs to extract visual features and model temporal relations. For example, consider a video of a person playing tennis. The slow pathway would capture the identity of the person, the shape and color of the racket and the ball, and the background scene. The fast pathway would capture the speed and direction of the ball, the movement of the person's arm and body, and the changes in the lighting and shadows. By fusing the two pathways, the visual encoder would be able to recognize the action of playing tennis, the style and skill of the player, and the context and environment of the video. Another example is a video of a car chase. The slow pathway would capture the type and model of the cars, the number and appearance of the drivers and passengers, and the road and traffic conditions. The fast pathway would capture the acceleration and deceleration of the cars, the steering and braking actions, and the collisions and near-misses. By fusing the two pathways, the visual encoder would be able to understand the situation and intention of the drivers, the risk and danger of the chase, and the outcome and consequence of the video.

In another example, a visual encoder uses transformer models to encode both spatial and temporal information in video content data 101. The visual encoder divides each frame into segments and projects the segments into a high-dimensional space. A spatial attention module is then used to capture the relations between different segments within each frame, and a temporal attention module is used to capture the relations between different frames across time (e.g., across shots). The visual encoder outputs a sequence of segment embeddings that represent video content data 101.

In another example, a visual encoder uses temporal excitation and aggregation to enhance the visual features and temporal relations in video content data 101. The visual encoder applies a two-dimensional (2D) CNN to extract frame-level features of video content data 101 and applies a temporal excitation module to selectively amplify the features that are relevant to the temporal context. The visual encoder applies a first temporal aggregation module to combine the features of adjacent frames into a single representation and applies a second temporal excitation module to refine the aggregated features. The visual encoder outputs a sequence of temporally aggregated and excited features that represent video content data 101.

The transformer encoder receives the video tokens from the video encoder and compresses them using cross-attention with query tokens or parameters. Cross-attention is a mechanism that allows one set of tokens (such as query tokens) to be combined with another set of tokens (such as image or text/audio tokens) based on their relevance or similarity. Cross attention aligns and/or fuses different modalities of data, such as text, image, sound, or video. For example, the transformer encoder aligns and/or fuses textual data (e.g., audio-based data) from video content data 101 with visual data from video content data 101. The query tokens or parameters are learned from a pretrained transformer encoder model and can capture the video context of video content data 101. In some examples, the transformer encoder is a Querying Transformer (QFormer) that implements quadrangle attention to focus on different shapes and orientations of objects in video content data 101, and to capture contextual information in video content data 101. In some examples, the output of the transformer encoder and/or the output of transformer component 106, is a smaller sequence of video tokens that are compatible with LLM component 108.

Transformer component 106 receives video tokens output from visual-language model sub-system 105 (e.g., from the transformer encoder). Transformer component 106 transforms the output of the transformer encoder into video embedding data 107 that is compatible with LLM component 108. Generally, transformer component 106 transforms a vector of a first dimension (e.g., the output from the transformer encoder) to a vector of a second dimension (e.g., for input to LLM component 108) by performing matrix multiplication on the first dimension (e.g., multiplying the first dimension with one or more values of a matrix). A vector (e.g., feature vector) is a data structure comprising attributes, represented numerically, of an object. A matrix is a rectangular array of numbers or symbols, arranged in rows and columns, that can be used to perform various operations and transformations. Visual-language model system 104 then provides video embedding data 107 to LLM component 108.

Video embedding data 107 are generated (e.g., by visual-language model system 104) by applying ML models to video content data 104. For example, as discussed previously, video embedding data 107 are provided by transformer component 106 and formatted in such a way that video embedding data 107 may be understood by and able to be input to LLM component 108. Video embedding data 107 includes numerical representations that capture the semantic meaning and content of at least a portion of video content data 101. For example, video embedding data 107 includes one or more vectors having one or more dimensions representing attributes of objects within video content data 101 (e.g., audiovisual or visual video content data 101). Video embedding data 107 represent various aspects of video content data 101, such as objects, actions, scenes, events, and emotions that are present in video content data 101. Video embedding data 107 can additionally or alternatively represent the temporal and causal relationships between different parts of video content data 101, such as the order, duration, and consequence of the actions or events. Video embedding data 107 can be representative of all of video content data 101 or a subset of video content data 101 (e.g., particular frames, ranges of frames, shots, or ranges of shots.

In some examples, video embedding data 107 includes RGB embeddings. RGB embeddings are video embeddings that are based on the color information of frames of video content data 101. In some examples, RGB embeddings are generated by CNNs to raw pixel values of the frames. CNNs are neural networks that use convolutional layers to extract features from audiovisual or visual content, such as images or videos (e.g., video content data 101). RGB embeddings describe the appearance and the spatial layout of the objects and scenes in video content data 101. In some examples, video embedding data 107 includes optical flow embeddings. Optical flow embeddings are video embeddings that are based on the motion information of the frames of video content data 101. In some examples, optical flow embeddings are generated by applying CNNs to optical flow fields, which are computed by measuring the displacement of the pixels between consecutive frames. Optical flow embeddings can capture the movement and the direction of the objects and actions in video content data 101.

In some examples, video embedding data 107 includes audio embeddings. Audio embeddings are based on the sound information of video content data 101. Audio embeddings may be generated by applying RNNs or transformers to raw audio signals or spectrograms of video content data 101. RNNs are neural networks that use recurrent layers to process sequential data, such as text or speech audio data (e.g., based on video content data 101). Audio embeddings can capture the speech, music, and noise in video content data 101. In some examples, video embedding data 107 includes text embeddings. Text embeddings may be based on the textual information of the audio of video content data 101, such as transcripts, captions, or subtitles. In some examples, text embeddings are generated by applying transformers or other natural language processing (NLP) models to raw text or tokens of the textual information. In some examples, text embeddings describe the language, topic, and/or sentiment of video content data 101.

LLM component 108 is an ML model that generates AD data 109 based on video embedding data 107, video insights data 103, user queries or prompts (e.g., "Please provide an audio description of this video"), and/or dialogue context (e.g., previous questions or requests provided to LLM component 108 during a current user session and/or previous user sessions). In some examples, LLM component 108 is a generative AI model, such as an LLM, another type of language model, a software code generation model, an image generation model, or an audio generation model. A generative AI model refers to a model or algorithm that has a primary function of content generation, in contrast to AI models having other primary functions, such as data classification, data grouping, or action selection. LLM component 108 is trained to interpret complex intent and cause and effect, and to interpret and generate sequences of tokens (e.g., parts of words), which may be in the form of natural language. In some examples, LLM component 108 is also trained to perform language translation, semantic search classification, complex classification, text/audio sentiment, summarization, summarization for an audience, and/or other natural language functionality.

In some examples, LLM component 108 is implemented using a neural network, (e.g., a deep neural network), that utilizes a transformer architecture to process received input. In other examples, LLM component 108 is implemented using an alternative ML model or a neural network that utilizes a different architecture, such as a CNN, an RNN, or an autoencoder. The neural network may include an input layer for receiving input, one or more hidden layers for performing computations associated with the input, and an output layer for providing a result for the input. In one example, the hidden layers include attention mechanisms that enable LLM component 108 to focus on specific portions of the input, and to generate context-aware outputs. LLM component 108 may be trained based on supervised learning techniques using a large corpus of annotated and/or unannotated media. The corpus of annotated and/or unannotated media includes audio description text and examples, video embeddings and/or annotations, video insights data and examples, and/or other data related to multimedia analysis. In such embodiments, based on the supervised learning techniques, LLM component 108 is trained to predict words or tokens (e.g., a next word or token) in a given text sequence.

In examples, the size and/or classification (e.g., language model versus LLM) of LLM component 108 is determined based on the number of words or tokens in the of the dataset used to train LLM component 108 or based on the number of parameters included in LLM component 108. For instance, the number of parameters for a language model (e.g., Bidirectional Encoder Representations from Transformers (BERT), Word2 Vec, Global and Vectors (GloVe), Embeddings from Language Models (ELMo), or XLNet) may be in the millions (or less), whereas the number of parameters for an LLM (e.g., Generative Pre-trained Transformer (GPT)-3 or GPT-4, Large Language Model Meta AI (LLaMA) 2, BigScience Large Open-science Open-access Multilingual Language Model (BLOOM)) may be in the billions (or more). The parameters of LLM component 108 are numerical values representing weights and biases that collectively define the behavior of LLM component 108. Typically, larger numbers of parameters result in a more complex LLM component 108 that has a strong understanding of the structure and meaning of data, which enables LLM component 108 to efficaciously identify intricate patterns in the data.

In some examples, LLM component 108 receives input from video indexer component 102, visual-language model system 104, transformer component 106, and/or recursively from LLM component 108 or memory storing outputs from LLM component 108. For instance, video indexer component 102, visual-language model system 104, transformer component 106, and/or LLM component 108 may include one or more algorithms that perform steps that create the input intended for LLM component 108. Video indexer component 102, visual-language model system 104, transformer component 106, and/or LLM component 108 then provide the input to LLM component 108 via a function or interface of the respective component. At least a portion of the input may be formatted to match an input format expected by LLM component 108. In at least one example, LLM component 108 also receives input directly from a user via a command line interface of a user device or system 100.

In examples, LLM component 108 expects input comprising at least a prompt that includes a statement (e.g., one or more terms) or a request intended for LLM component 108. In some examples, LLM component 108 expects input to comprise additional or alternative information. The additional or alternative information expected in the input may be based on the statement or request included in the prompt. For instance, when the prompt includes a request to generate an audio description for video content data 101, LLM component 108 expects the input to additionally include video content data (e.g., video embeddings or audio embeddings) or a storage location of video content associated with video content data 101. However, when a prompt is not included in the input, LLM component 108 expects the input to include an instruction (e.g., corresponding to user activity or application/service events) indicating a requested action. In examples, LLM component 108 expects the input and/or each portion of the input (e.g., the prompt, video embedding data 107, video insights data 103) to be formatted in accordance with a particular schema or rule set and/or to be provided in a particular sequence. For example, the input may be limited to a particular number of terms or tokens, a prompt may be required to include or omit certain terms or tokens, video embedding data 107 may be required to be formatted using a particular encoder, and video insights data 103 may be limited to including certain types of insights. Additionally, the input may be expected to be provided in a particular order, such as the prompt is provided first, video insights data 103 is provided second, and video embedding data 107 is provided third.

Upon receiving input, LLM component 108 processes the input and outputs a response corresponding to a user request associated with the input. For instance, in response to receiving input from a user device that is associated with a request for AD data 109, LLM component 108 outputs AD data 109 to device 110. Alternatively, in response to receiving input from a user device that is associated with a request for AD data 109, LLM component 108 outputs AD data 109 to an intermediate service (not illustrated), which provides an audio file based on AD data 109 to device 110.

In some examples, LLM component 108 uses previous AD data in addition to video insights data 103 and video embedding data 107 to generate AD data 109. Previous AD data may refer to AD data associated with previous frames, shots, or user sessions. For example, at a previous time, LLM component 108 uses previous video insights data and previous video embedding data (created during the previous time) in video content data 101 to create previous AD data. At a subsequent time (e.g., a current time), LLM component 108 uses video insights data 103 and video embedding data 107 (created during the current time) in video content data 101, as well as the previous AD data (created during the previous time) to generate AD data 109.

As one specific example, suppose video content data 101 is a movie scene where a character is walking in a park and sees a dog. LLM component 108 may use video insights data 103 to extract information such as the character's name, the park's name, the dog's breed, and any dialogue or sound effects. LLM component 108 may also use video embedding data 107 (e.g., numerical representations that capture the semantic meaning and content of at least a portion of video content data 101, as previously discussed) to further determine information about video content data 101 (e.g., objects, actions, scenes, events, and emotions of video content data 101, temporal and causal relationships between different parts of video content data 101, such as the order, duration, and consequence of the actions or events). LLM component 108 may then use previous AD data from previous scenes to generate AD data 109 for the current scene. For example, if the previous AD data indicated "John is walking in Central Park," and the current scene is determined by LLM component 108 or a comparison component of system 100 to be similar to a previous scene (e.g., a scene of Central Park) (e.g., AD data or portions of AD data that would be generated of the current scene is substantially similar to AD data or portions of AD data generated of the previous scene, where the similarity of all or the portions of the previous and current AD data is evaluated by LLM component 108 or the comparison component), LLM component 108 may generate AD data 109 as "John continues walking in Central Park and sees a golden retriever." However, if the current scene is different from the previous scene, LLM component 108 may generate AD data 109 as "The scene changes to John walking in Central Park. He sees a golden retriever and smiles."

As another specific example, suppose video content data 101 is a sports highlight reel where different shots show different players, teams, scores, and actions. LLM component 108 may use video insights data 103 to extract information such as player names, team names, team scores, and player actions. LLM component 108 may then use previous AD data associated with previous shots to generate AD data 109 for the current shot. For example, the previous AD data associated with a previous shot indicated "A shot shows Lebron James scoring a three-pointer for the Lakers against the Celtics. The score is 45-42 for the Lakers." If the current shot is determined by LLM component 108 or a comparison component of system 100 to be similar to the previous shot (e.g., based on the scene, players, or teams) (e.g., AD data or portions of AD data that would be generated of the current scene is substantially similar to AD data or portions of AD data generated of the previous scene, where the similarity of all or the portions of the previous and current AD data is evaluated by LLM component 108 or the comparison component), LLM component 108 may use video insights data 103 and video embedding data 107 for the current shot and use previous AD data from the previous shot to generate AD data 109 as "Another shot shows Lebron James scoring another three-pointer for the Lakers against the Celtics. The score is 48-42 for the Lakers." However, if the current shot is different from the previous shot (e.g., based on the scene, players, or teams), LLM component 108 may use video insights data 103 for the current shot and use video embedding data 107 for all of (or a portion of) video content data 101, which is a longer time period, to generate AD data 109 as "The highlight reel switches to a different game. A shot shows Kevin Durant scoring a dunk for the Nets against the Warriors. The score is 32-28 for the Nets."

In some examples, LLM component 108 combines video insights data 103, video embedding data 107, and/or previous AD data by concatenating them with one or more tokens. A token is a symbol or a string that separates different types of data and indicates their source or format. For example, LLM component 108 may use a token such as "<V>" to denote video insights data 103, a token such as "<E>" to denote video embedding data 107, and a token such as "<A>" to denote previous AD data. LLM component 108 may concatenate this data with the tokens to form a single input for generating AD data 109. For example, if video insights data 103 includes OCR data, facial detection/recognition data, and speech to text data, LLM component 108 may concatenate them as "<V>OCR data<|>Facial detection/recognition data<|>Speech to text data." Similarly, if video embedding data 107 is a vector of numbers, LLM component 108 may concatenate it as "<E>0.34, −0.12, 0.56, . . . " Likewise, if previous AD data is a text description, LLM component 108 may concatenate it as "<A>A man is sitting on a couch and watching TV." LLM component 108 may combine this data with the tokens to form a single input as "<V>OCR data<|>Facial detection/recognition data<|>Speech to text data<E>0.34, −0.12, 0.56, . . . <A>A man is sitting on a couch and watching TV." LLM component 108 may then use this input to generate AD data 109 for the current instance in video content data 101.

In other examples, LLM component 108 combines video insights data 103, video embedding data 107, and/or previous AD data using cross-attention. Cross-attention is a technique that allows LLM component 108 to process different types of data and learn the relationships and dependencies between the data. For example, LLM component 108 may perform cross-attention of video insights data 103 and video embedding data 107 to learn how the visual features and the semantic features of video content data 101 are related. LLM component 108 may also perform cross-attention of video insights data 103 and previous AD data to learn how the content in a current frame or shot in video content data 101 and the content in previous frames or shots in video content data 101 are related. LLM component 108 may also perform cross-attention of video embedding data 107 and previous AD data to learn how the current instance in video content data 101 and the previous instances in video content data 101 are different. LLM component 108 may then use the cross-attention results to generate AD data 109 for the current instance in video content data 101. In some cases, whether concatenation or cross-attention is used by LLM component 108 is based on the type of LLM used. For example, concatenation may be used by LLMs such as LLAMA 2, which may be incapable of using cross-attention.

As an example of LLM component 108 performing cross-attention to learn how the visual features and the semantic features of video content data 101 are related, assume video insights data 103 for a movie trailer includes facial detection/recognition data and speech to text data, and video embedding data 107 includes a vector of numbers. LLM component 108 performs cross-attention to learn which parts of the facial detection/recognition data and the speech to text data correspond to which parts of the vector of numbers. This way, LLM component 108 can learn the identity, emotion, and dialogue of the characters in the scene and how they relate to the theme, genre, and mood of the movie trailer.

As an example of LLM component 108 performing cross-attention to learn how content in current and previous frames/shots in video content data 101 are related, assume video insights data 103 for a movie trailer includes OCR data and action detection data, and previous AD data includes a text description. LLM component 108 performs cross-attention to learn which parts of the OCR data and the action detection data correspond to which parts of the text description. This way, LLM component 108 can learn the context, plot, and continuity of the scenes in the movie trailer and how they relate to the previous scenes in the movie trailer.

As an example of LLM component 108 performing cross-attention to learn how content in current and previous frames/shots in video content data 101 are different, assume video embedding data 107 for a movie trailer includes a vector of numbers, and previous AD data includes a text description. LLM component 108 performs cross-attention to learn which parts of the vector of numbers and the text description are different or similar. This way, LLM component 108 can learn the novelty, contrast, and surprise of the scenes in the movie trailer and how they differ from the previous scenes in the movie trailer.

AD data 109 represents textual or audio data generated by LLM component 108. AD data 109 provides a complete and/or immersive textual- or audio-based description of audio elements, visual elements, explicit elements, and/or implicit elements of video content data 101. Explicit elements are those that are clearly stated or shown in the video, such as the dialogue, the actions, the scenery, the music, and the like. Implicit elements are those that are implied or suggested by the video, but not directly stated or shown, such as the themes, the messages, the emotions, the ideologies, and the like. For example, in a video of a war scene, the explicit elements might include the sounds of gunfire, the explosions, the soldiers, the uniforms, the flags, and the like. The implicit elements might include the horror of war, the patriotism, the courage, the fear, the violence, and the like. In another example, in a video of a comedy show, the explicit elements might include the jokes, the laughter, the gestures, the costumes, the props, and the like. The implicit elements might include the humor, the irony, the satire, the criticism, the social commentary, and the like. AD data 109 includes descriptions of visual, audio, contextual, or other similar information explicit and/or implicitly present in AD data 109. In some examples, AD data 109 additionally includes information that is not based on video content data 101 and/or is based on other data that is relevant for a user and has some relation to video content data 101. For example, the information that is not based on video content data 101 and/or is based on other data that is relevant for a user and has some relation to video content data 101 may include background information, trivia, reviews, or commentary about the video content data 101. For instance, the additional information may be used to establish context for video content data 101. AD data 109 may take the form of any textual- or audio-based output, such as an output file (e.g., a text file, an audio file, a PDF file) or a data package that is provided to another service or tool (e.g., an STT tool used to convert textual based information in AD data 109 to an audio format). AD data 109 may additionally or alternatively be provided as an on-screen response without an associated output file. In some examples, AD data 109 may be processed before provided as output to a user. For example, AD data 109 may be reformatted to have an appealing or user-specified visual presentation.

In examples, AD data 109 is customizable according to the preferences and needs of a user. In some examples, system 100 or device 110 provides a UI that allows users to specify one or more preferences for AD data 109 output by system 100 (e.g., LLM component 108). Users access the UI as part of the process of device 110 providing video content data 101 to system 100 and/or video indexer component 102. For example, a user of device 110 uploads video content data 101 to a video playback application/service and the application/service asks (e.g., automatically asks) the user whether they have preferences for the resulting audio data, or the application/service provides a UI that allows the user to select their preferences. Alternatively, the user may have an existing user profile (e.g., stored by the application/service or by system 100) that includes the user's preferences. The user profile information may be applied (e.g., automatically applied) to some or all video content requests. In some examples, the user can provide feedback on AD data 109. For example, a user may view and listen to AD data 109 through a UI that may include a feedback tool. The feedback tool allows the user to provide explicit feedback on the quality and suitability of the AD data 109, such as its volume, descriptiveness, timing, or the like. System 100 may use the explicit feedback to request new or updated AD data 109 from LLM component 108, which may also learn from the user's preferences and improve the accuracy of the AD data 109. Additionally, the user may provide implicit feedback by updating their UI settings or user profile, which can also trigger a new AD data request to system 100. LLM component 108 can also use the implicit feedback to adjust the AD data 109 accordingly, such as its verbosity, tone, or the like. AD data 109 can be integrated with other services or applications that can benefit from the textual or audio description of video content data 101. For example, AD data 109 can be used for accessibility purposes, education, entertainment, research, or analysis.

Device 110 provides video content data 101 to video indexer component 102 and/or visual-language model system 104. In some examples, device 110 provides a different portion of video content data 101 to video indexer component 102 (e.g., video content data 101-*a*) than to visual-language model system 104 (e.g., video content data 101-*b*). In other examples, device 110 provides the same portion of video content data 101 to video indexer component 102 (e.g., video content data 101-*a*) as to visual-language model system 104 (e.g., video content data 101-*b*). Device 110 represents a device such as a computer (e.g., a PC, a laptop, or a server device), a mobile device (e.g., smartphone or a tablet), or any other type of electronic processing device. Device 110 uses one or more processors (e.g., CPUs, GPUs, or TPUs) to execute instructions and perform tasks. In some examples, device 110 is implemented by the same system or device that implements system 100. In other examples, device 110 and system 100 are implemented separately and located remotely (e.g., geographically) from one another.

Having described a system that may be employed by the embodiments disclosed herein, methods that may be performed by such systems are now provided. For example, the methods 200-400 may be performed by system 100, device 110, video indexer component 102, visual-language model system 104, visual-language model sub-system 105, transformer component 106, and/or LLM component 108. Although methods 200-400 are described in the context of system 100 of FIG. 1, the performance of methods 200-400 are not limited to such examples.

Figure 2:
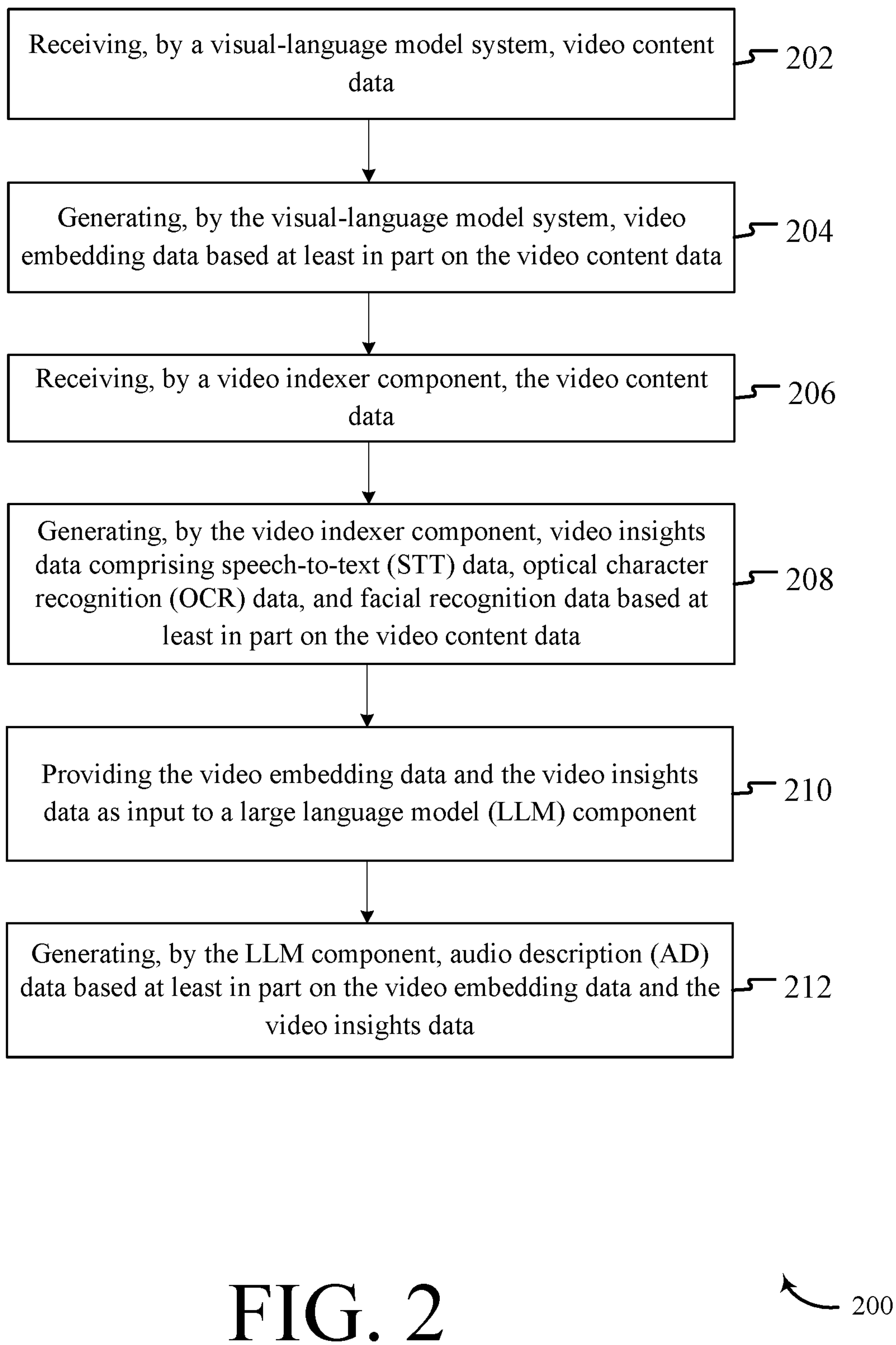
FIG. 2 illustrates a first method flow for a video scene describer in accordance with examples described herein.

FIG. 2 illustrates a first example method for a video scene describer. Method 200 begins at operation 202, where a visual-language model system (e.g., visual-language model system 104) receives video content data (e.g., video content data 101) from an application, service, or device (e.g., from device 110). The video content data represents visual data or audiovisual data. Examples of video content data 101 include movies, videos, GIFs, images, and/or other forms of digital media that can be displayed, with or without sound, on a display medium (e.g., a screen).

At operation 204, the visual-language model system generates video embedding data (e.g., video embedding data 107) based at least in part on the video content data. In some examples, the visual-language model system comprises a visual encoder, a relation aggregator, a transformer encoder, and/or a transformer. The relation aggregator may be a GMHRA, and the transformer encoder may be a QFormer. The visual encoder transforms the video content data into a suitable representation for further processing. The relation aggregator summarizes pairwise or global relations between the visual features of different frames of the video content data based on, for example, pooling, attention, or graph neural networks. The transformer encoder uses cross-attention to combine (e.g., align and fuse) the video (e.g., visual) and/or language data from the video content data into a unified video embedding. The transformer transforms the video embedding data such that the video embedding data is compatible with one or more downstream components, such as an LLM component. In some examples, the video embedding data comprises one or more vectors of numbers representing the semantic meaning or content of at least a portion of the video content data.

At operation 206, a video indexer component (e.g., video indexer component 102) receives the video content data from the application, service, or device that provided the video content data to the visual-language model system. The video indexer component may receive all or a portion of the video content data and may receive the same or a different portion of the video content data as provided to the visual-language model system. In some examples, the video indexer component comprises tools, such as an OCR tool, a face recognition tool, a speech transcription tool (e.g., STT), an audio effects detection tool, a text-based emotion detection tool, a keyword extraction tool, a label identification tool, a named entity tool, an object tracking tool, and/or a topics inference tool.

At operation 208, the video indexer component generates video insights data (e.g., video insights data 103) using one or more tools of the video indexer component. The video insights data may comprise, among other things, transcripts, OCR elements (e.g., text that might appear on signs, papers, or clothing), objects, topics, keywords, object information (e.g., age, gender, emotion, landmarks), non-speech audio sounds (e.g., applause, laughter, music, silence), text sentiment scores and/or classification, relevant words or phrases, labels (e.g., objects, scenes, an activities labels), named entities (e.g., names of people, places, organizations, brands), object detection information (e.g., detected objects and predicted object locations), topic inferences (e.g., inferred topics or themes), speech attributes of audio data (e.g., language, accent, tone, speed, genre, style, mood), visual attributes of visual data (e.g., theme, color, brightness, contrast, saturation, location, date, time, weather, camera angle, movement, zoom, focus, facial expressions, gestures, posture, eye contact), and other scene-related information (e.g., background attributes, foreground attributes, transitions, logos, trademarks, symbols, icons). The video indexer component provides the textual information and/or the text encoded information to the LLM component as video insights data.

At operation 210, the video embedding data and the video insights data is provided as input to an LLM component (e.g., LLM component 108). In examples, the LLM component expects input comprising one or more portions, such as a prompt, video content data (e.g., video embeddings and/or audio embeddings) or a storage location of video content associated with the video content data, or an instruction (e.g., corresponding to user activity or application/service events) indicating a requested action, a user or query context (e.g., user identity, user preferences, a current application/service being used by the user, query time, user location), or an expected output (e.g., expected content or an expected content format, style, length). Additionally, the LLM component may expect the input and/or each portion of the input to be formatted in accordance with a particular schema or rule set (e.g., using a common delimiter, a standard encoding, or a predefined vocabulary), provided using a particular transmission criteria (e.g., using a secure connection, a secure application/service, or an authentication scheme), and/or to be provided in a particular sequence. Accordingly, the video indexer component and/or the visual-language model system provide the expected input to the LLM component.

At operation 212, the LLM component generates AD data (e.g., AD data 109) based at least in part on the video embedding data and the video insights data. In some examples, the LLM component generates the AD data based on an auto-recursive algorithm. The auto-recursive algorithm uses the video insights data and the video embedding data from a current frame or shot of the video content data and uses previous AD data associated with one or more previous frames or shots of video content data to generate AD data for the current frame or shot. In some examples, generating the AD data comprises concatenating the video embedding data with the video insights data using one or more tokens. In some examples, generating the AD data comprises performing cross-attention on the video embedding data and the video insights data. In some examples, the AD data comprises a textual description of audio elements, visual elements, explicit elements, and/or implicit elements of the video content data. In some examples, the AD data additionally includes information that is not based on the video content data and/or is based on other data that has some relation to the video content data.

Figure 3:
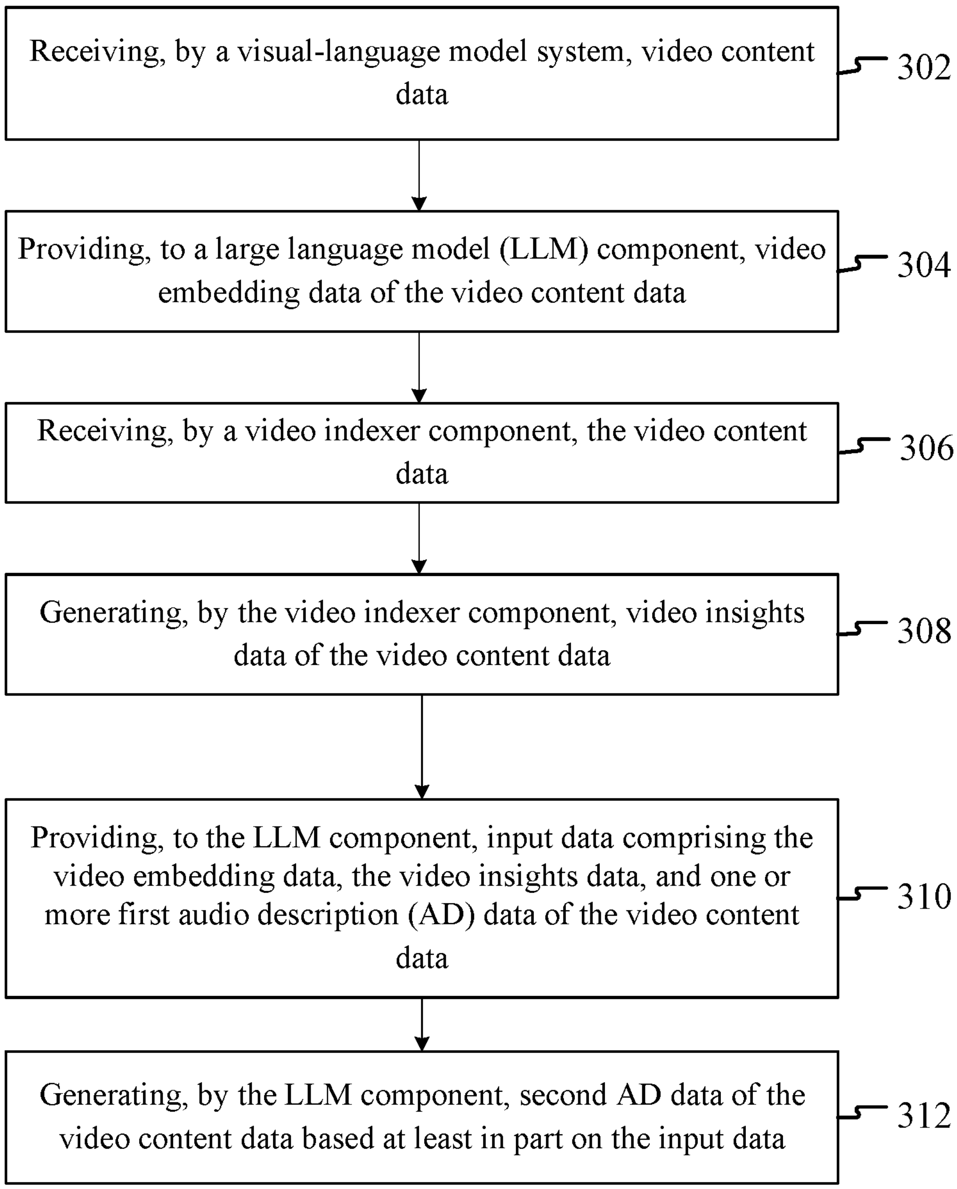
FIG. 3 illustrates a second method flow for a video scene describer in accordance with examples described herein.

FIG. 3 illustrates a second example method for a video scene describer. Method 300 begins at operation 302, where a visual-language model system (e.g., visual-language model system 104) receives video content data (e.g., video content data 101) from an application, service, or device (e.g., from device 110). The video content data represents visual data or audiovisual data. Examples of video content data 101 include movies, videos, GIFs, images, and/or other forms of digital media that can be displayed, with or without sound, on a display medium (e.g., a screen).

At operation 304, the visual-language model system provides, to an LLM component (e.g., LLM component 108), video embedding data (e.g., video embedding data 107) of the video content data. In some examples, the video embedding data comprises one or more vectors of numbers representing the semantic meaning or content of at least a portion of the video content data The video embedding data represents various aspects of video content data, such as objects, actions, scenes, events, and emotions that are present in the video content data. The video embedding data can additionally or alternatively represent the temporal and causal relationships between different parts of the video content data, such as the order, duration, and consequence of the actions or events. The video embedding data can be representative of all of video content data 101 or a subset of video content data 101 (e.g., particular frames, ranges of frames, shots, or ranges of shots.

At operation 306, a video indexer component (e.g., video indexer component 102) receives the video content data. The video indexer component may receive all or a portion of the video content data and may receive a same or a different portion as that provided to the visual-language model system. In some examples, the video indexer component comprises tools, such as an OCR tool, a face recognition tool, a speech transcription tool (e.g., STT), an audio effects detection tool, a text-based emotion detection tool, a keyword extraction tool, a label identification tool, a named entity tool, an object tracking tool, and/or a topics inference tool.

At operation 308, the video indexer component generates video insights data (e.g., video insights data 103) using one or more tools of the video indexer component. The video insights data may comprise, among other things, transcripts, OCR elements (e.g., text that might appear on signs, papers, or clothing), objects, topics, keywords, object information (e.g., age, gender, emotion, landmarks), non-speech audio sounds (e.g., applause, laughter, music, silence), text sentiment scores and/or classification, relevant words or phrases, labels (e.g., objects, scenes, an activities labels), named entities (e.g., names of people, places, organizations, brands), object detection information (e.g., detected objects and predicted object locations), topic inferences (e.g., inferred topics or themes), speech attributes of audio data (e.g., language, accent, tone, speed, genre, style, mood), visual attributes of visual data (e.g., theme, color, brightness, contrast, saturation, location, date, time, weather, camera angle, movement, zoom, focus, facial expressions, gestures, posture, eye contact), and other scene-related information (e.g., background attributes, foreground attributes, transitions, logos, trademarks, symbols, icons). The video indexer component provides the textual information and/or the text encoded information to the LLM component as video insights data.

At operation 310, the video indexer component provides, to the LLM component, input data comprising the video insights data and/or one or more first AD data of the video content data. In some examples, one or more first AD data is recursively provided back to the LLM component (e.g., via an intermediate memory component configured to store the one or more first AD data). In some examples, the outputs of one or more of the tools includes textual information (e.g., a file or a string of characters). In some examples, the video indexer component includes a text encoder configured to convert the textual information from the one or more tools into a number or vector representation that can be processed by a computer or the LLM component. Different text encodings may use different rules and standards to map characters to numbers.

At operation 312, the LLM component generates second AD data of the video content data based at least in part on the input data. The second AD data may occur after the one or more first AD data in the timeline of the video content data. The second AD data represents textual- or audio-based data generated by the LLM component. The second AD data provides a complete and/or immersive textual- or audio-based description of audio elements, visual elements, explicit elements, and/or implicit elements of the video content data. The second AD data includes descriptions of visual, audio, contextual, or other similar information explicit and/or implicitly present in the second AD data. In some examples, the second AD data additionally includes information that is not based on the video content data and/or is based on other data that has some relation to video content data. In some examples, the second AD data to a narrator tool that converts textual based information in the second AD data and/or the one or more first AD data to an audio format (e.g., an audio file).

Figure 4:
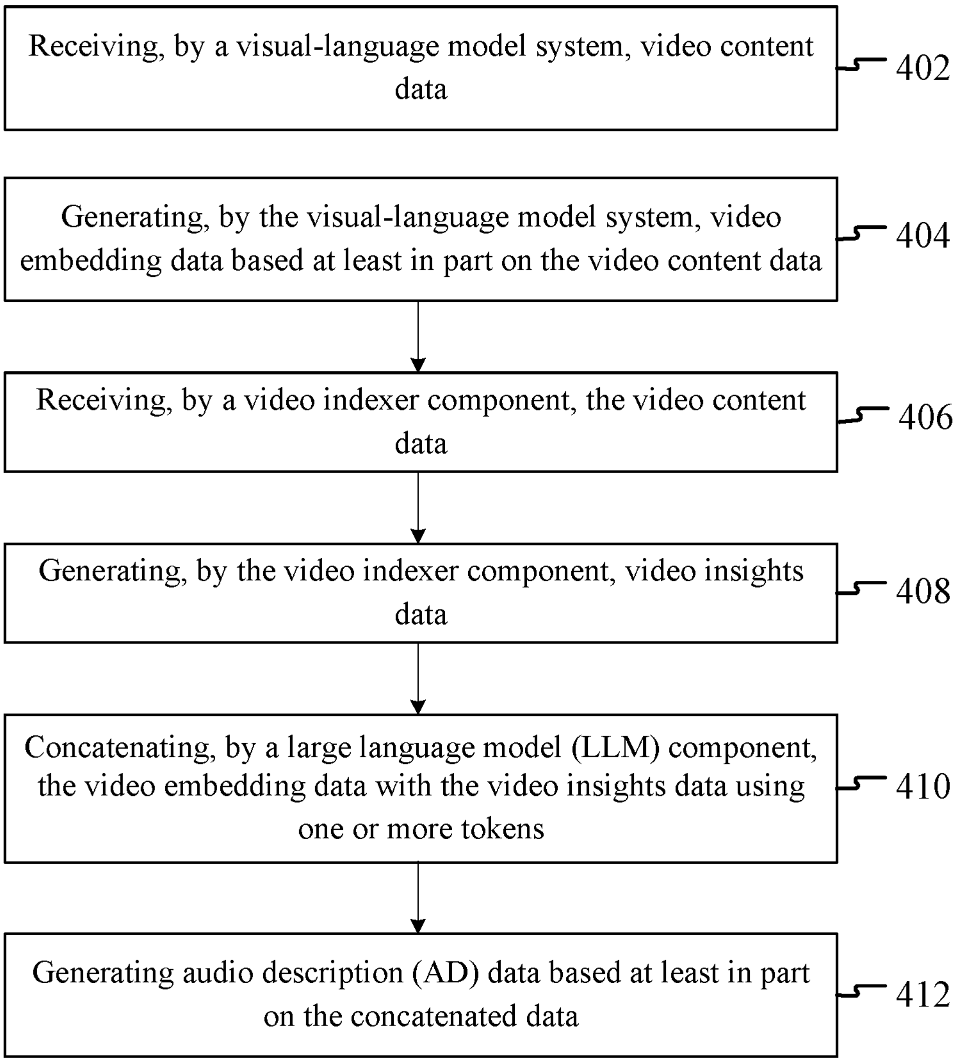
FIG. 4 illustrates a third method flow for a video scene describer in accordance with examples described herein.

FIG. 4 illustrates a third example method for a video scene describer. Method 400 begins at operation 402, where a visual-language model system (e.g., visual-language model system 104) receives video content data (e.g., video content data 101) (e.g., from device 110) from an application, service, or device (e.g., from device 110). The video content data represents visual data or audiovisual data. Examples of video content data 101 include movies, videos, GIFs, images, and/or other forms of digital media that can be displayed, with or without sound, on a display medium (e.g., a screen).

At operation 404, the visual-language model system generates video embedding data (e.g., video embedding data 107) based at least in part on the video content data. In some examples, the visual-language model system comprises a visual encoder, a relation aggregator, a transformer encoder, a transformer, or a combination thereof. The visual encoder transforms the video content data into a suitable representation for further processing. The relation aggregator summarizes pairwise or global relations between the visual features of different frames of the video content data based on, for example, pooling, attention, or graph neural networks. The transformer encoder uses cross-attention to combine (e.g., align and fuse) the video (e.g., visual) and/or language data from the video content data into a unified video embedding. The transformer transforms the video embedding data such that the video embedding data is compatible with one or more downstream components, such as an LLM component. In some examples, the video embedding data comprises one or more vectors of numbers representing the semantic meaning or content of at least a portion of the video content data.

At operation 406, a video indexer component (e.g., video indexer component 102) receives the video content data from the application, service, or device that provided the video content data to the visual-language model system. The video indexer component may receive all or a portion of the video content data and may receive a same or a different portion as that provided to the visual-language model system. In some examples, the video indexer component comprises tools, such as an OCR tool, a face recognition tool, a speech transcription tool (e.g., STT), an audio effects detection tool, a text-based emotion detection tool, a keyword extraction tool, a label identification tool, a named entity tool, an object tracking tool, and/or a topics inference tool.

At operation 408, the video indexer component generates video insights data (e.g., video insights data 103) using one or more tools of the video indexer component. The video insights data may comprise, among other things, transcripts, OCR elements (e.g., text that might appear on signs, papers, or clothing), objects, topics, keywords, object information (e.g., age, gender, emotion, landmarks), non-speech audio sounds (e.g., applause, laughter, music, silence), text sentiment scores and/or classification, relevant words or phrases, labels (e.g., objects, scenes, an activities labels), named entities (e.g., names of people, places, organizations, brands), object detection information (e.g., detected objects and predicted object locations), topic inferences (e.g., inferred topics or themes), speech attributes of audio data (e.g., language, accent, tone, speed, genre, style, mood), visual attributes of visual data (e.g., theme, color, brightness, contrast, saturation, location, date, time, weather, camera angle, movement, zoom, focus, facial expressions, gestures, posture, eye contact), and other scene-related information (e.g., background attributes, foreground attributes, transitions, logos, trademarks, symbols, icons). The video indexer component provides the textual information and/or the text encoded information to the LLM component as video insights data.

At operation 410, an LLM component (e.g., LLM component 108) concatenates the video embedding data with the video insights data using one or more delimiters. For example, the LLM component may use a delimiter such as "<V>" to denote the video insights data, a delimiter such as "<E>" to denote the video embedding data, and a delimiter such as "<A>" to denote previous AD data. The LLM component may then concatenate this data with the delimiters to form a single input for generating the AD data. In some examples, the one or more delimiters indicate the separation of the video insights data from the video embedding data. For example, if the video insights data includes OCR data, facial detection/recognition data, and speech to text data, the LLM component may concatenate them as "<V>OCR data<|>Facial detection/recognition data<|>Speech to text data." In some examples, the concatenating further comprises concatenating one or more previous AD data with the video embedding data and the video insights data. For instance, if previous AD data is a text description, the LLM component may concatenate it as "<A>A man is sitting on a couch and watching TV." The LLM component may then combine this data and other data with the delimiters to form a single input as, for example, one or more strings of characters. For example, the one or more strings of characters may include "<V>OCR data<|>Facial detection/recognition data<|>Speech to text data<E>0.34, −0.12, 0.56, . . . <A>A man is sitting on a couch and watching TV." In some examples, the visual-language model system is configured to provide the video embedding data that is compatible with input to the LLM component.

At operation 412, the LLM component generates AD data (e.g., AD data 109) based at least in part on the concatenated data. The AD data represents textual- or audio-based data generated by the LLM component. The AD data provides a complete and/or immersive textual- or audio-based description of audio elements, visual elements, explicit elements, and/or implicit elements of the video content data. The AD data includes descriptions of visual, audio, contextual, or other similar information explicit and/or implicitly present in the AD data. In some examples, the AD data additionally includes information that is not based on the video content data and/or is based on other data that has some relation to video content data. In some examples, the LLM component provides the AD data to a device (e.g., a user device, a server device, a provider device), a system, a module, a software program, an application, or the like.

Figure 5:
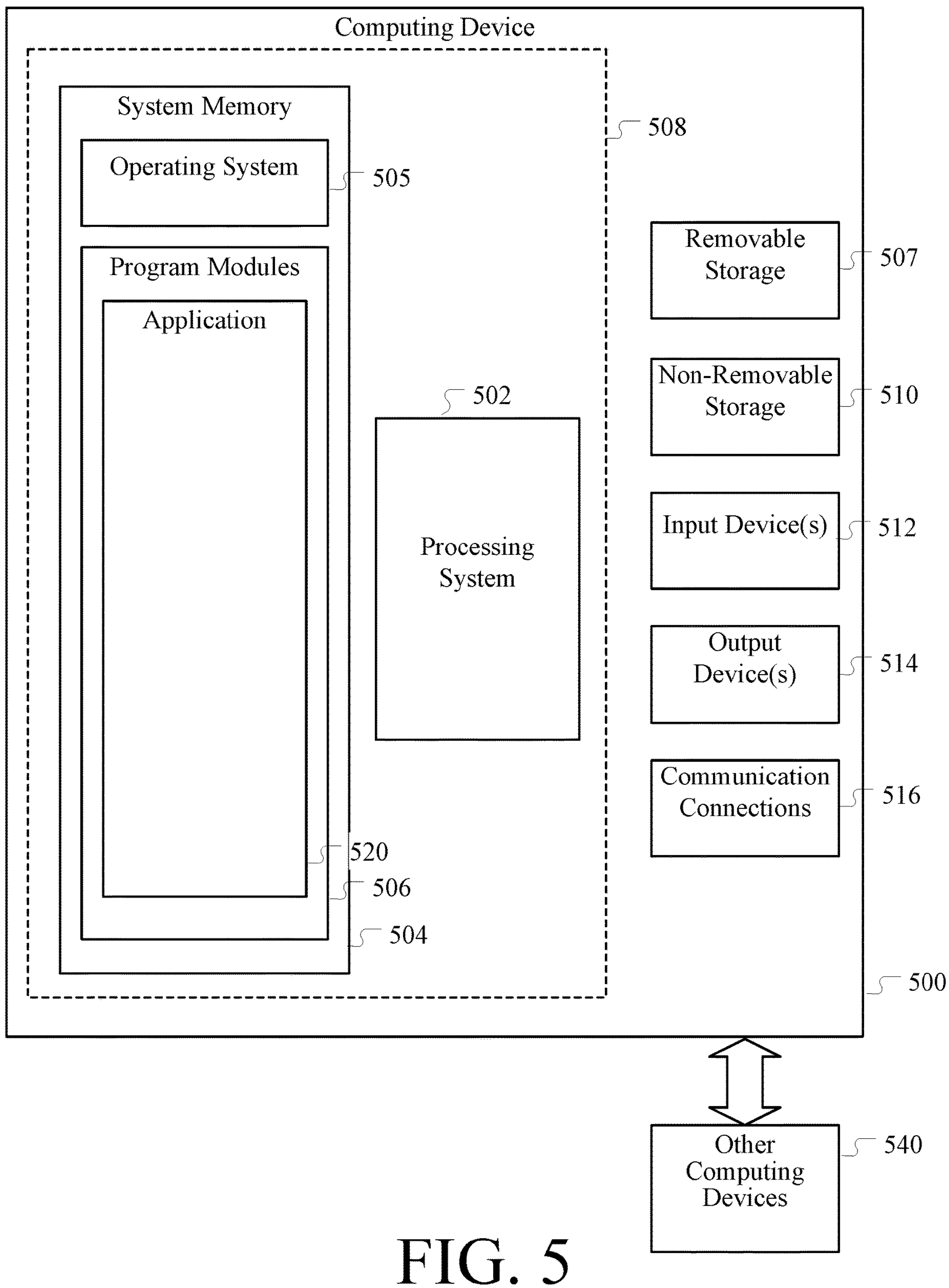
FIG. 5 illustrates a block diagram including physical components of a computing device in accordance with examples described herein.

FIG. 5 is a block diagram illustrating physical components (e.g., hardware) of a computing device 500 with which aspects of the disclosure may be practiced. The computing device components described below may be suitable for the computing devices and systems described above. In a basic configuration, the computing device 500 includes at least one processing system 502 comprising processing unit(s) and a system memory 504. Depending on the configuration and type of computing device, the system memory 504 may comprise volatile storage (e.g., random access memory (RAM)), non-volatile storage (e.g., read-only memory (ROM)), flash memory, or any combination of such memories.

The system memory 504 includes an operating system 505 and one or more program modules 506 suitable for running software application 520, such as one or more components supported by the systems described herein. The operating system 505, for example, may be suitable for controlling the operation of the computing device 500.

Furthermore, embodiments of the disclosure may be practiced in conjunction with a graphics library, other operating systems, or any other application program and is not limited to any particular application or system. This basic configuration is illustrated in FIG. 5 by those components within a dashed line 508. The computing device 500 may have additional features or functionality. For example, the computing device 500 may also include additional data storage devices (removable and/or non-removable) such as, for example, magnetic disks, or optical disks. Such additional storage is illustrated in FIG. 5 by a removable storage device 507 and a non-removable storage device 510.

As stated above, a number of program modules and data files may be stored in the system memory 504. While executing on the processing unit 502, the program modules 506 (e.g., application 520) may perform processes including the aspects, as described herein. Other program modules that may be used in accordance with aspects of the present disclosure may include electronic mail and contacts applications, word processing applications, spreadsheet applications, database applications, slide presentation applications, drawing or computer-aided application programs, etc.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. For example, embodiments of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip). Embodiments of the disclosure may also be practiced using other technologies capable of performing logical operations such as, for example, AND, OR, and NOT, including mechanical, optical, fluidic, and quantum technologies. In addition, embodiments of the disclosure may be practiced within a general-purpose computer or in any other circuits or systems.

The computing device 500 may also have one or more input device(s) 512 such as a keyboard, a mouse, a pen, a sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 540. Examples of suitable communication connections 516 include radio frequency (RF) transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 504, the removable storage device 507, and the non-removable storage device 510 are all computer storage media examples (e.g., memory storage). Computer storage media may include RAM, ROM, electrically erasable ROM (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information, and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, communication media may include wired media such as a wired network or direct-wired connection, and wireless media such as acoustic, RF, infrared, and other wireless media.

In some examples, the present disclosure describes a system comprising: a processing system; and memory comprising executable instructions that when executed, perform operations, comprising: receiving, by a visual-language model system, video content data; generating, by the visual-language model system, video embedding data based at least in part on the video content data; receiving video insights data comprising STT data, OCR data, and facial recognition data; providing the video embedding data and the video insights data to an LLM component; receiving, from the LLM component, AD data based at least in part on the video embedding data and the video insights data; and providing the AD data to a device.

In some examples, the LLM component generates the AD data based on an auto-recursive algorithm, the operations further comprising: generating at least one previous AD data, wherein at least one of the video embedding data, the video insights data, or the AD data correspond to a given shot, and wherein the at least one previous AD data corresponds to at least one previous shot before the given shot.

In some examples, generating the AD data using the auto-recursive algorithm comprises generating the AD data based on at least one of the video embedding data, the video insights data, or the at least one previous AD data.

In some examples, the video embedding data comprises at least one of audio embeddings or RGB embeddings.

In some examples, the video insights data further comprises at least one of transcripts, objects, clothing, age, gender, emotion, or landmarks.

In some examples, the visual-language model system comprises at least one of a visual encoder, a transformer encoder, a relation aggregator, or a transformer.

In some examples, the transformer encoder uses cross attention to combine visual and language data of video content data into a unified video embedding.

In some examples, the video embedding data comprises at least one vector of numbers.

In some examples, generating the AD data comprises concatenating the video embedding data with the video insights data using a plurality of delimiters.

In some examples, generating the AD data comprises performing cross-attention on the video embedding data and the video insights data.

In some examples, the AD data comprises a textual description of at least one of: audio elements of the video content data; visual elements of the video content data; explicit elements of the video content data; or implicit elements of the video content data.

In some examples, the present disclosure describes a system comprising: a processing system; and memory comprising executable instructions that when executed, perform operations, comprising: receiving, by a visual-language model system, video content data; providing, to an LLM component, video embedding data of the video content data; receiving, from a video indexer component, video insights data of the video content data; providing, to the LLM component, input data comprising the video embedding data, the video insights data, and first AD data of the video content data; receiving, from the LLM component, second AD data of the video content data based at least in part on the input data; and providing the second AD data to a device.

In some examples, the at least one of the video embedding data, the video insights data, or the second AD data correspond to a given shot, and wherein the first AD data corresponds to at least one previous shot before the given shot.

In some examples, the video embedding data, the video insights data, and the second AD data correspond to a given frame, and wherein the first AD data corresponds to previous frames before the given frame.

In some examples, the operations further comprise: providing the second AD data to a narrator tool.

In some examples, the present disclosure describes a system comprising: a processing system; and memory comprising executable instructions that when executed, perform operations, comprising: receiving, by a visual-language model system, video content data; generating, by the visual-language model system, video embedding data based on the video content data; receiving, from a video indexer component, video insights data based on the video content data; providing, to an LLM component, the video embedding data and the video insights data; creating concatenated data by concatenating, by the LLM component, the video embedding data with the video insights data using a plurality of delimiters; and providing, by the LLM component, AD data for presentation based on the concatenated data.

In some examples, the plurality of delimiters indicate the separation of the video insights data from the video embedding data.

In some examples, the concatenating further comprises concatenating at least one previous AD data with the video embedding data and the video insights data.

In some examples, the video insights data comprises at least one of OCR data, STT data, audio effects data, emotion data, keywords, object tracking data, or topics inference data.

In some examples, the video embedding data comprises at least one of audio embeddings or RGB embeddings.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

What is claimed is:

1. A system comprising:
a processing system; and
memory comprising executable instructions that when executed, perform operations, comprising:
receiving, by a visual-language model system, video content data;
generating, by the visual-language model system, video embedding data based at least in part on the video content data;
receiving video insights data comprising speech-to-text (STT) data, optical character recognition (OCR) data, and facial recognition data;
providing the video embedding data and the video insights data to a large language model (LLM) component;
receiving, from the LLM component, audio description (AD) data based at least in part on the video embedding data and the video insights data, wherein the AD data is received from the LLM component in an audio format and describes at least one insight of the video insights data; and
providing the AD data to a device.

2. The system of claim 1, wherein the LLM component generates the AD data based on an auto-recursive algorithm, the operations further comprising:
generating at least one previous AD data, wherein at least one of the video embedding data, the video insights data, or the AD data correspond to a given shot, and wherein the at least one previous AD data corresponds to at least one previous shot before the given shot.

3. The system of claim 2, wherein generating the AD data using the auto-recursive algorithm comprises generating the AD data based on at least one of the video embedding data, the video insights data, or the at least one previous AD data.

4. The system of claim 1, wherein the video embedding data comprises at least one of audio embeddings or RGB embeddings.

5. The system of claim 1, wherein the video insights data further comprises at least one of transcripts, objects, clothing, age, gender, emotion, or landmarks.

6. The system of claim 1, wherein the visual-language model system comprises at least one of a visual encoder, a transformer encoder, a relation aggregator, or a transformer.

7. The system of claim 6, wherein the transformer encoder uses cross attention to combine visual and language data of video content data into a unified video embedding.

8. The system of claim 1, wherein the video embedding data comprises at least one vector of numbers.

9. The system of claim 1, wherein generating the AD data comprises concatenating the video embedding data with the video insights data using a plurality of delimiters.

10. The system of claim 1, wherein generating the AD data comprises performing cross-attention on the video embedding data and the video insights data.

11. The system of claim 1, wherein the AD data comprises a textual description of at least one of:
audio elements of the video content data;
visual elements of the video content data;
explicit elements of the video content data; or
implicit elements of the video content data.

12. A system comprising:
a processing system; and
memory comprising executable instructions that when executed, perform operations, comprising:
receiving, by a visual-language model system, video content data;
providing, to a large language model (LLM) component, video embedding data of the video content data;
receiving, from a video indexer component, video insights data of the video content data;
providing, to the LLM component, input data comprising the video embedding data, the video insights data, and first audio description (AD) data of the video content data;
receiving, from the LLM component, second AD data of the video content data based at least in part on the input data, wherein the second AD data is received from the LLM component in an audio format and describes at least one insight of the video insights data; and
providing the second AD data to a device.

13. The system of claim 12, wherein the at least one of the video embedding data, the video insights data, or the second AD data correspond to a given shot, and wherein the first AD data corresponds to at least one previous shot before the given shot.

14. The system of claim 12, wherein the video embedding data, the video insights data, and the second AD data correspond to a given frame, and wherein the first AD data corresponds to previous frames before the given frame.

15. The system of claim 12, the operations further comprising:
providing the second AD data to a narrator tool.

16. A system comprising:
a processing system; and
memory comprising executable instructions that when executed, perform operations, comprising:
receiving, by a visual-language model system, video content data;
generating, by the visual-language model system, video embedding data based on the video content data;
receiving, from a video indexer component, video insights data based on the video content data;
providing, to a large language model (LLM) component, the video embedding data and the video insights data;

creating concatenated data by concatenating, by the LLM component, the video embedding data with the video insights data using a plurality of delimiters; and providing, by the LLM component, audio description (AD) data for presentation based on the concatenated data, wherein the AD data is received from the LLM component in an audio format and describes at least one insight of the video insights data.

17. The system of claim 16, wherein the plurality of delimiters indicate the separation of the video insights data from the video embedding data.

18. The system of claim 16, wherein the concatenating further comprises concatenating at least one previous AD data with the video embedding data and the video insights data.

19. The system of claim 16, wherein the video insights data comprises at least one of optical character recognition (OCR) data, speech-to-text (STT) data, audio effects data, emotion data, keywords, object tracking data, or topics inference data.

20. The system of claim 16, wherein the video embedding data comprises at least one of audio embeddings or RGB embeddings.

* * * * *